United States Patent
Isaacson et al.

(10) Patent No.: US 9,141,287 B2
(45) Date of Patent: Sep. 22, 2015

(54) REMOTE ENABLING OF STORAGE

(71) Applicant: Novell, Inc., Provo, UT (US)

(72) Inventors: Scott Alan Isaacson, Woodland Hills, UT (US); Jim Alan Nicolet, Port Orchard, UT (US); Nadeem Ahmad Nazeer, Lehi, UT (US); Bradley Garrell Nicholes, Pleasant Grove, UT (US); Kevin Marinus Boogert, Sandy, UT (US)

(73) Assignee: Novell, Inc., Provo, UT (US)

( * ) Notice: Subject to any disclaimer, the term of this patent is extended or adjusted under 35 U.S.C. 154(b) by 244 days.

(21) Appl. No.: 13/832,378

(22) Filed: Mar. 15, 2013

(65) Prior Publication Data

US 2014/0281292 A1    Sep. 18, 2014

(51) Int. Cl.
 G06F 12/02    (2006.01)
 G06F 3/06    (2006.01)

(52) U.S. Cl.
 CPC ........ *G06F 3/06* (2013.01); *G06F 3/067* (2013.01); *G06F 3/0607* (2013.01); *G06F 3/0661* (2013.01)

(58) Field of Classification Search
 CPC ... G06F 3/0607; G06F 3/0661; G06F 3/0664; G06F 3/067; G06F 17/30569
 See application file for complete search history.

(56) References Cited

U.S. PATENT DOCUMENTS

| | | | |
|---|---|---|---|
| 6,151,331 A | 11/2000 | Wilson | |
| 6,718,372 B1 * | 4/2004 | Bober | 709/217 |
| 7,047,285 B2 * | 5/2006 | Burgess | 709/220 |
| 7,363,457 B1 | 4/2008 | Dekoning et al. | |
| 8,098,598 B1 * | 1/2012 | Contino et al. | 370/259 |
| 8,756,338 B1 * | 6/2014 | Potakamuri | 709/238 |
| 2002/0065924 A1 * | 5/2002 | Barrall et al. | 709/227 |
| 2002/0138570 A1 * | 9/2002 | Hickey | 709/204 |
| 2003/0096596 A1 * | 5/2003 | Sini et al. | 455/412 |
| 2005/0259618 A1 * | 11/2005 | Ahya et al. | 370/331 |
| 2006/0026257 A1 | 2/2006 | Frank et al. | |
| 2009/0022120 A1 * | 1/2009 | Buer et al. | 370/338 |
| 2010/0211802 A1 | 8/2010 | Humphries | |
| 2012/0075664 A1 * | 3/2012 | Nichols et al. | 358/1.15 |
| 2012/0109885 A1 | 5/2012 | Grube et al. | |
| 2012/0110055 A1 * | 5/2012 | Van Biljon et al. | 709/201 |
| 2013/0085985 A1 * | 4/2013 | Maxfield | 707/609 |

* cited by examiner

*Primary Examiner* — Hiep Nguyen

(74) *Attorney, Agent, or Firm* — Schwegman Lundberg & Woessner, P.A.

(57) ABSTRACT

Techniques for enabling storage remotely are presented. A REpresentational State Transfer (REST) front-end interface is interfaced to a legacy file system via a backend interface that directly interacts with the native storage and protocols of the legacy file system. The REST interface is presented as the frontend interface to the legacy file system making the storage of the legacy file system available to web or network-enabled devices.

20 Claims, 3 Drawing Sheets

REMOTE ENABLING OF STORAGE

BACKGROUND

Data is essential to all organizations. The data relevant to organizations includes data produced by the organizations, data consumed by the organizations, and data analyzed by the organizations. In many instances, organizations have spent many years (if not decades) collecting and storing data on traditional file servers. Sometimes, these file servers are identity controlled and include rigorous business processes set up around the servers to control and protect the data with anti-virus software, audit/control software, and backup and restore software.

Data is big business these days and one does not have to look very far to see evidence in this by the organizational heavy weights with a presence in the data storage business: IBM, Microsoft, HP, Oracle, Google, Facebook, and others.

However, to date storage services are: generally only available via tightly coupled heavy weight protocols; not directly accessible via lightweight clients such as mobile phones and tablets; locked inside corporate firewalls; and not inherently searchable (not indexed). Evidence of this exists by the large amount of data that is currently just available via mounted or mapped drives (NCP (Netware Control Program), CIFS (Common Internet File System), NFS (Network File System), FTP (File Transfer Protocol), etc.) and not available via today's web oriented applications.

In fact, today's web access for data is often optimized around technology that focuses on: indexing, searching, alerting, notifying, sharing, and collaborating. Still further, today's data access focuses on generic interfaces to access the data, which exists in the cloud; rather, then in legacy hierarchical file systems.

Many technologies exists today in the industry to make data access generic and location independent (Amazon S3, Dropbox, Sky Drive, Google Drive, iCloud, etc.); however, these technologies all share one significant problem and that is they all work on new data and not with existing legacy data. As a result, unless an enterprise wants to go through a significant data port, years of knowledge represented in its legacy data remains largely inaccessible via modern platforms and devices.

SUMMARY

Various embodiments of the invention provide techniques for remotely enabling a storage environment. In an embodiment, a method for remote storage enablement is presented.

Specifically, a storage operation is received that is directed to legacy storage; the storage operation is in a first format that is unrecognized by a legacy Application Programming Interface (API) used by the legacy storage. Next, the storage operation is translated from the first format to a second format associated with the legacy API. Finally, the storage operation is sent in the second format to the legacy storage for processing.

DETAILED DESCRIPTION

Figure 1:
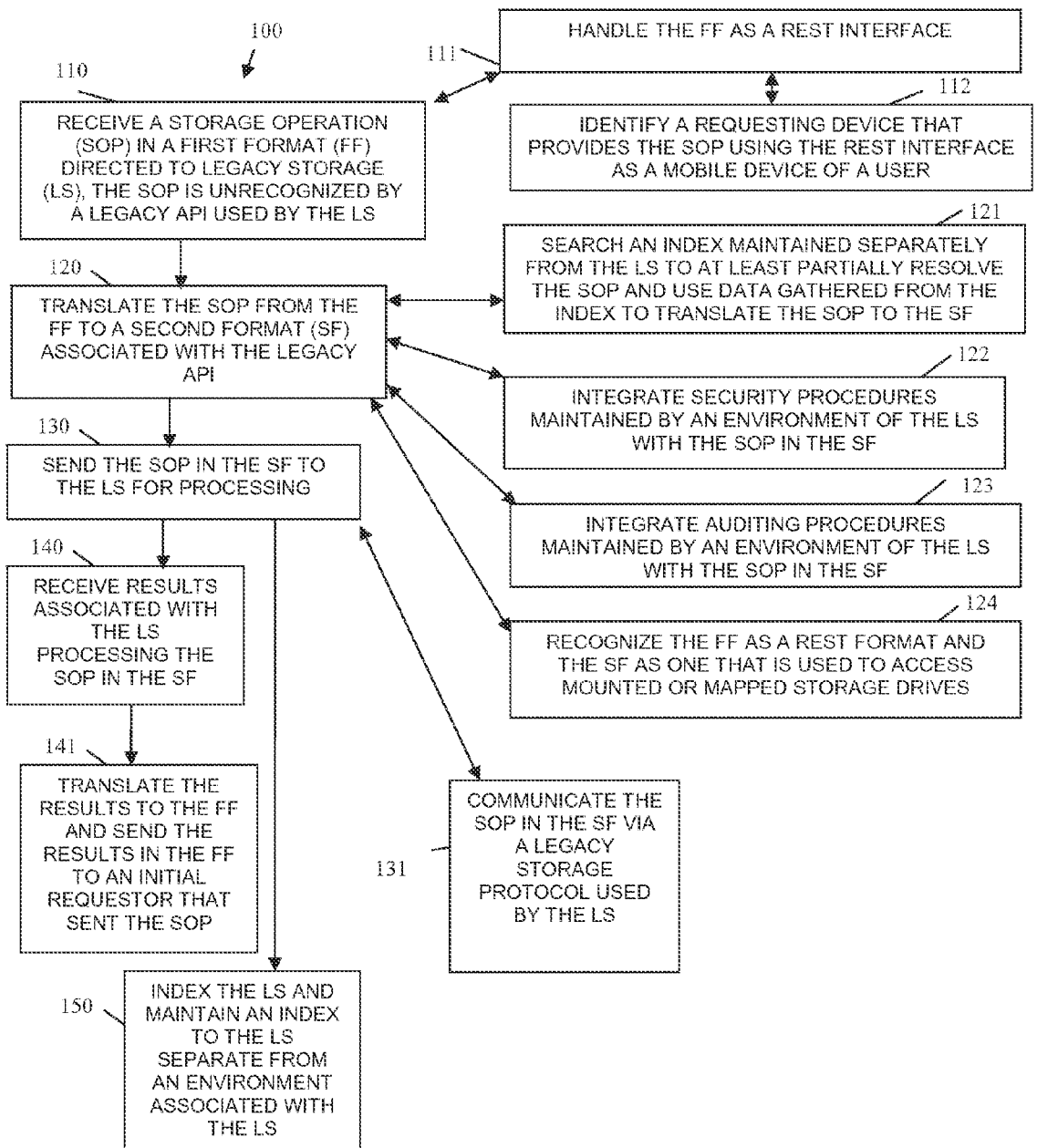
FIG. 1 is a diagram of a method for remote storage enablement, according to an example embodiment presented herein.

A "resource" includes a user, service, system, device, directory, data store, groups of users, file system, combinations and/or collections of these things, etc. A "principal" is a specific type of resource, such as an automated service or user that at one time or another is an actor on another principal or another type of resource. A designation as to what is a resource and what is a principal can change depending upon the context of any given network transaction. Thus, if one resource attempts to access another resource, the actor of the transaction may be viewed as a principal. Resources can acquire and be associated with unique identities to identify unique resources during network transactions.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures.

Also, the techniques presented herein are implemented in machines as executable instructions; the machines include a processor or processor-enabled devices (hardware processors). These machines are configured and their memories programmed to specifically perform the processing of the methods and systems presented herein. Moreover, the methods and systems are implemented and reside within memory and/or a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

Figure 2:
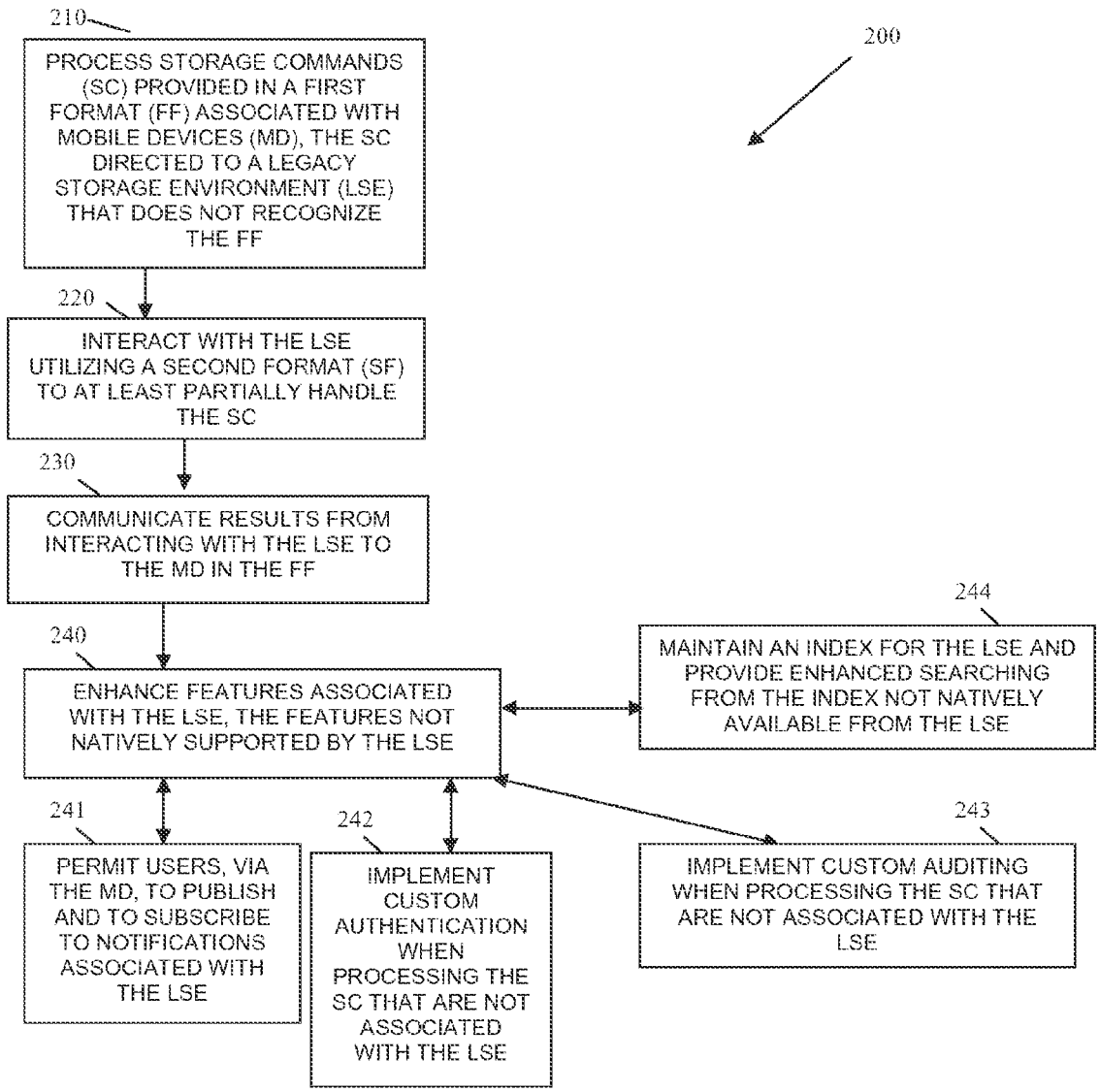
FIG. 2 is a diagram of another method for remote storage enablement, according to an example embodiment presented herein.
Figure 3:
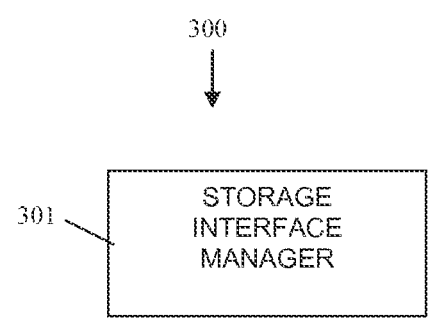
FIG. 3 is a storage enablement system, according to an example embodiment.

It is within this context that embodiments of the invention are now discussed within the context of the FIGS. 1-3.

FIG. 1 is a diagram of a method 100 for remote storage enablement, according to an example embodiment presented herein. The method 100 (hereinafter "storage interface manager") is implemented as executable instructions that are programmed and reside within memory and/or a non-transitory computer-readable storage medium for execution on one or more processors of a device. The storage interface manager is also operational over a network; the network is wired, wireless, or a combination of wired and wireless.

In an embodiment, the storage interface manager operates as a reverse proxy for a legacy storage environment. That is, storage access requests originating over a network that is external to the legacy storage environment are intercepted and processed by the storage interface manager. In some cases, the storage interface manager may exists in a cloud and be completely external to the legacy storage environment. The access requests can be made directly to the legacy storage environment, in which case they are routed to the cloud that processes the storage interface manager; or, the access requests can be made directly to the storage interface manager, in which case the storage interface manager resolves the proper legacy storage environment and directly interacts with it to resolve the access requests.

At 110, the storage interface manager receives a storage operation directed to legacy storage. The storage operation is in a first format that in unrecognized by a legacy Application Programming Interface (API) used by the legacy storage. By legacy it is meant that the storage environment and the API of the storage already exist and are unchanged for purposes of the teachings presented herein. In other words, to gain access to the legacy storage existing and new APIs can be used (as described herein) without changes to the legacy storage having to be made.

According to an embodiment, at 111, the storage interface manager recognizes the first format as a storage operation issued via a REpresentational State Transfer (REST) interface.

Continuing with the embodiment of 111 and at 112, the storage interface manager identifies a requesting device that provides the storage operation via the REST interface as a mobile device of a user, such as but not limited to, a phone, a tablet, a wearable device, and the like.

At 120, the storage interface manager translates the storage operation from the first format to a second format associated with the legacy API. In other words, the storage interface manager includes a plug in to interact with the legacy storage via the legacy API of the legacy storage's environment.

According to an embodiment, at 121, the storage interface manager searches an index that is maintained separately from the legacy storage to at least partially resolve the storage operation. Also, the storage interface manager uses data gathered from the index to translate the storage operation to the second format. So, the storage interface manager can include other processes that monitor and index the legacy storage, where the index can reside within the processing environment of the storage interface manager and does not have to reside in the legacy storage environment. This permits enhancements on the legacy storage as well that can be implemented and deployed by the storage interface manager independent of the legacy API of the legacy storage.

In another case, at 122, the storage interface manager integrates security procedures maintained by an environment of the legacy storage with the storage operation in the second format. So, any security required by the legacy storage's environment can be provided for checking with the storage operation in the second format.

Similar to 122 and at 123, the storage interface manager integrates auditing procedures maintained by the legacy storage's environment with the storage operation in the second format. Thus, auditing required by the legacy storage's environment can be represented in the storage operation within the second format.

In an embodiment, at 124, the storage interface manager recognizes the first format as a REST format and the second format as a particular format or API used to access traditional mounted or mapped storage drives. So, the legacy storage can be associated with mounted or mapped storage and can use mapped and mounted APIs and protocols whereas the user provides storage commands in a mobile REST format and the storage interface manager acts as an intermediary to enable the legacy storage for remote network access.

At 130, the storage interface manager sends the storage operation in the second format to the legacy storage for processing. The storage operation in the second format can be substantially different from the original storage operation provided in the first format. This is so because some of the processing can be done by the storage interface manager and some other processing may have to be added to the second format by the storage interface manager.

In an embodiment, at 131, the storage interface manager communicates the storage operation in the second format via a legacy storage protocol used by the legacy storage.

According to an embodiment, at 140, the storage interface manager receives results back associated with the legacy storage processing the storage operation in the second format.

Continuing with the embodiment of 140 and at 141, the storage interface manager translates the results to the first format and sends the translated results in the first format to an initial requestor that sent the storage operation in the first instance. This too can be achieved via a REST interface that the storage interface manager interacts with the requestor with.

In an embodiment, at 150, the storage interface manager indexes the legacy storage and maintains an index to the legacy storage from an environment associated with the legacy storage. This was discussed above at 121 and is discussed below as well with the discussion of the FIG. 2.

FIG. 2 is a diagram of another method 200 for remote storage enablement, according to an example embodiment presented herein. The method 200 (herein after referred to as "storage controller") is implemented as executable instructions that are programmed and resides within memory and/or a non-transitory machine-readable storage medium and that executes on one or more processors of a device. The storage controller is also operational over a network, and the network may be wired, wireless, or a combination of wired and wireless.

The storage controller presents another and in some cases enhanced perspective of the storage interface manager presented above in detail with respect to the FIG. 1.

At 210, the storage controller processes storage commands provided in a first format and associated with mobile devices. The storage commands are directed to a legacy storage environment that does not recognize and that cannot natively process the storage commands in the first format. The mobile devices can include phones, tablets, laptops wearable devices, and the like.

At 220, the storage controller interacts with the legacy storage environment while utilizing a second format to at least partially handle the storage commands.

At 230, the storage controller communicates results from interacting with the legacy storage environment to the mobile devices in the first format.

According to an embodiment, at 240, the storage controller enhances features associated with the legacy storage environment. These enhanced features are not natively supported by the legacy storage environment. That is, the storage controller uses a legacy API associated with the legacy storage environment to offload some processing and to interact with the legacy storage environment to enhance certain aspects of the legacy storage environment.

For example, at 241, the storage controller permits users, via their mobile devices, to publish and to subscribe to notifications associated with the legacy storage environment. In this case, users can synch to files or subsets of storage via mobile devices via a notification mechanism provided by the storage controller but not natively provided by the legacy storage environment.

In another case, at 242, the storage controller implements custom authentication when processing the storage commands. The custom authentication not associated with the legacy storage environment. So, enhanced security can be achieved via the storage controller acting as an intermediary to the legacy storage environment.

In yet another case, at 243, the storage controller implements custom auditing when processing the storage commands that are not associated with the legacy storage environment.

Also, at 244, the storage controller maintains an index for the legacy storage environment and provides via that index enhanced searching from the index that is not natively available from the legacy storage environment.

FIG. 3 is a storage enablement system 300, according to an example embodiment. The components of the storage enablement system 300 are implemented as executable instructions and programmed and reside within memory and/or a non-transitory machine-readable storage medium that executes on one or more processors of a device and is operational over a network. The network may be wired, wireless, or a combination of wired and wireless.

In an embodiment, the storage enablement system 300 implements, inter alia, the methods 100 and 200 of the FIGS. 1 and 2, respectively.

The storage enablement system 300 includes a storage interface manager 301.

The storage enablement system 300 includes memory configured with the storage interface manager 301. Processors of the storage enablement system 300 executed the storage interface manager 301. Processing associated with the storage interface manager 301 was described above with respect to the methods 100 and 200 of the FIGS. 1 and 2, respectively.

The storage interface manager 301 is configured to act as an intermediary, between client interfaces and legacy interfaces of legacy storage environments for purposes of providing remote access to the legacy storage environments. The client interfaces can include interfaces associated with mobile devices, such as REST interfaces.

According to an embodiment, the server that implements the storage interface manager is accessible via or as a cloud processing environment, which is separate and remote from each of the legacy storage environments.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented and programmed within memory and/or a non-transitory machine-readable storage medium and processed by a device configured to perform the method, comprising:
receiving, at the device, a storage operation directed to legacy storage, the storage operation in a first format that is unrecognized by a legacy Application Programming Interface (API) used by the legacy storage;
translating, via the device, the storage operation from the first format to a second format associated with the legacy API; and
sending, via the device, the storage operation in the second format to the legacy storage for processing, and operating the device as a reverse proxy for an environment associated with the legacy storage for intercepting the storage operation.

2. The method of claim 1 further comprising, receiving, at the device, results associated with the legacy storage processing the storage operation in the second format.

3. The method of claim 2 further comprising, translating, at the device the results to the first format and sending the results in the first format to an initial requestor that sent the storage operation.

4. The method of claim 1 further comprising, pushing, via the device, a notification to a subscriber, when changes to subscribed portions of the legacy storage are detected.

5. The method of claim 1 further comprising, indexing, via the device, the legacy storage and maintaining an index to the legacy storage separate from the environment associated with the legacy storage.

6. The method of claim 1, wherein receiving further includes handling the first format as a REpresentational State Transfer (REST) interface.

7. The method of claim 6, wherein handling further includes identifying a requesting device providing the storage operation using the REST interface as a mobile device of a user.

8. The method of claim 1, wherein translating further includes searching an index maintained separately from the legacy storage to at least partially resolve the storage operation and using data gathered from the index to translate the storage operation to the second format.

9. The method of claim 1, wherein translating further includes integrating security procedures maintained by the environment of the legacy storage with the storage operation in the second format.

10. The method of claim 1, wherein translating further includes integrating auditing procedures maintained by the environment of the legacy storage with storage operation in the second format.

11. The method of claim 1, wherein translating further includes recognizing the first format at a REpresentational State Transfer (REST) format and the second format as one that is used to access mounted or mapped storage drives.

12. The method of claim 1, wherein sending further includes communicating the storage operation in the second format via a legacy storage protocol used by the legacy storage.

13. A method implemented and programmed within memory and/or a non-transitory machine-readable storage medium and processed by a server configured to perform the method, comprising:
processing, at the server, storage commands provided in a first format associated with mobile devices, the storage commands directed to a legacy storage environment that does not recognize the first format;
interacting, at the server, with the legacy storage environment utilizing a second format to at least partially handle the storage commands; and
communicating, from the server, results from interacting with the legacy storage environment to the mobile devices in the first format, and operating the server as a reverse proxy for a legacy storage environment and intercepting the storage commands.

14. The method of claim 13 further comprising, enhancing, via the server, features associated with the legacy storage environment, the features not natively supported by the legacy storage environment.

15. The method of claim 14, wherein enhancing further includes permitting users, via mobile devices, to publish and to subscribe to notifications associated with the legacy storage environment.

16. The method of claim 14, wherein enhancing further includes implementing custom authentication when processing the storage commands that are not associated with the legacy storage environment.

17. The method of claim 14, wherein enhancing further includes implementing custom auditing when processing the storage commands that are not associated with the legacy storage environment.

18. The method of claim 14, wherein enhancing further includes maintaining an index for the legacy storage environment and providing enhanced searching from the index not natively available from the legacy storage environment.

19. A system, comprising:
   a memory configured with a storage interface manager that processes on one or more processors of a server;
   wherein the storage interface manager is configured to act as an intermediary between client interfaces and legacy interfaces of legacy storage environments to provide remote access to the legacy storage environments, and wherein the server is configured to operate the storage interface manager as a reverse proxy for the legacy storage environments.

20. The system of claim 19, wherein the server is accessible via a cloud processing environment that is separate and remote from each of the legacy storage environments.

* * * * *

UNITED STATES PATENT AND TRADEMARK OFFICE
CERTIFICATE OF CORRECTION

| | |
|---|---|
| PATENT NO. | : 9,141,287 B2 |
| APPLICATION NO. | : 13/832378 |
| DATED | : September 22, 2015 |
| INVENTOR(S) | : Isaacson et al. |

It is certified that error appears in the above-identified patent and that said Letters Patent is hereby corrected as shown below:

In the claims

In column 6, line 44, in Claim 10, after "with", insert --the--, therefor

Signed and Sealed this
Fifth Day of July, 2016

Michelle K. Lee
*Director of the United States Patent and Trademark Office*